United States Patent [19]
Wright

[11] Patent Number: 5,279,041
[45] Date of Patent: Jan. 18, 1994

[54] LEVEL STRAIGHT-EDGE APPARATUS AND METHOD OF CONSTRUCTION

[76] Inventor: Randall J. Wright, 2000 Moraine End, Delafield, Wis. 53018

[21] Appl. No.: 956,835

[22] Filed: Oct. 5, 1992

Related U.S. Application Data

[63] Continuation of Ser. No. 714,332, Jun. 12, 1991, abandoned, which is a continuation of Ser. No. 449,081, Dec. 8, 1989, abandoned, which is a continuation of Ser. No. 182,990, Apr. 18, 1988, abandoned.

[51] Int. Cl.⁵ .............................................. G01C 9/28
[52] U.S. Cl. ........................................ 33/379; 33/382; 33/451; 33/485
[58] Field of Search ............... 33/379, 380, 381, 382, 33/383, 451, 365, 480, 485, 432, 479, 481, 474

[56] References Cited

U.S. PATENT DOCUMENTS

| | | | |
|---|---|---|---|
| 423,669 | 3/1890 | Byrne | 33/451 |
| 621,358 | 3/1899 | Merrill | 33/381 |
| 854,325 | 5/1907 | Belcher | 33/489 |
| 3,302,233 | 2/1967 | Sebastiani | 33/381 X |
| 3,593,428 | 7/1971 | Jacoff | 33/379 |

FOREIGN PATENT DOCUMENTS

| | | | |
|---|---|---|---|
| 1528280 | 4/1968 | France | 33/381 |
| 452002 | 10/1949 | Italy | 33/451 |
| 467635 | 12/1951 | Italy | 33/451 |
| 592654 | 3/1959 | Italy | 33/379 |

*Primary Examiner*—Thomas B. Will
*Attorney, Agent, or Firm*—Jones, Day, Reavis & Pogue

[57] ABSTRACT

A measuring instrument provided with measuring vials for determining level or pitch relationships and a graduated straight edge for measuring linear distance. In the first embodiment, the instrument consists of a composite aluminum and plastic structure where the plastic structure forms the body portion having the vial holders and viewing windows and the aluminum portion forms the graduated straight edge. A second embodiment consists of an aluminum structure having a flat elongated frame portion and an integrally formed base portion disposed perpendicularly thereto. The frame portion forms the graduated straight edge and carries the measuring vials.

26 Claims, 2 Drawing Sheets

U.S. Patent  Jan. 18, 1994  Sheet 1 of 2  5,279,041
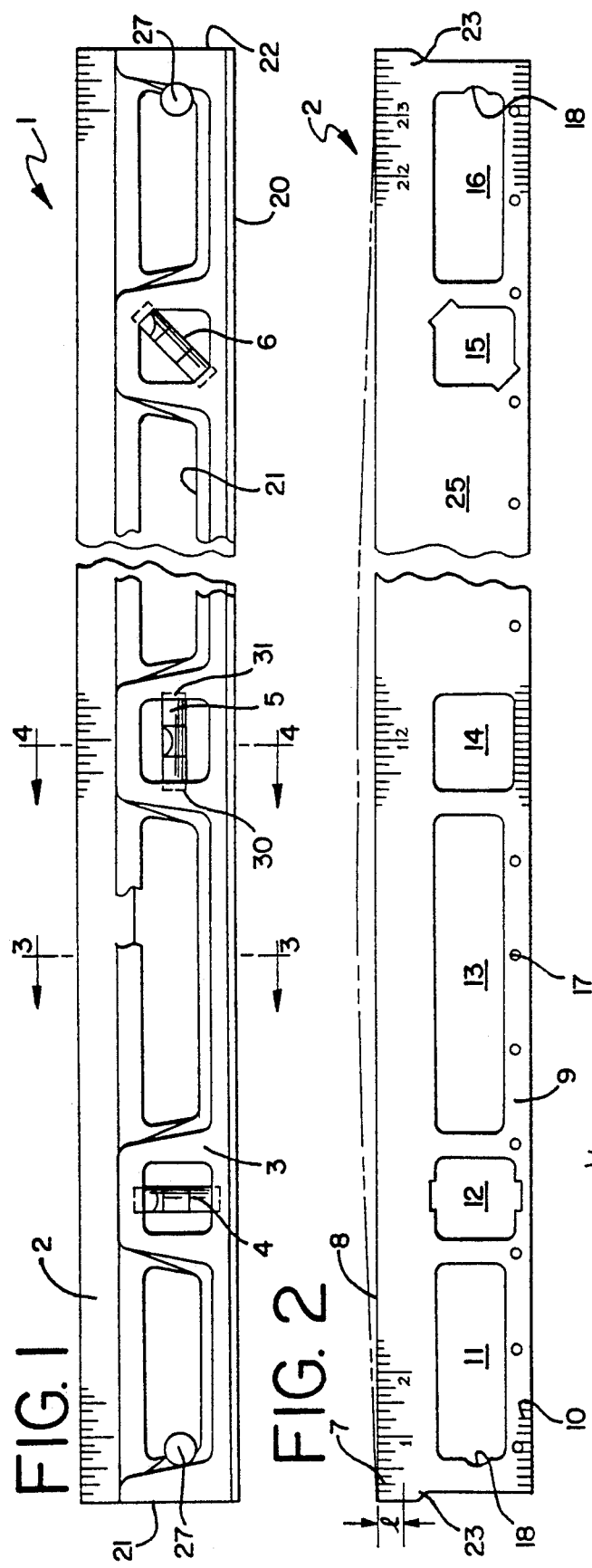
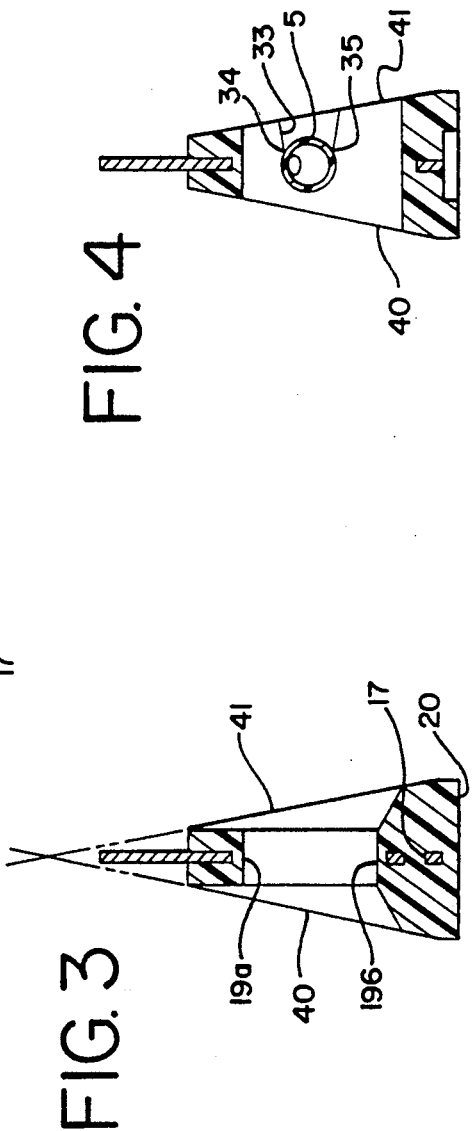

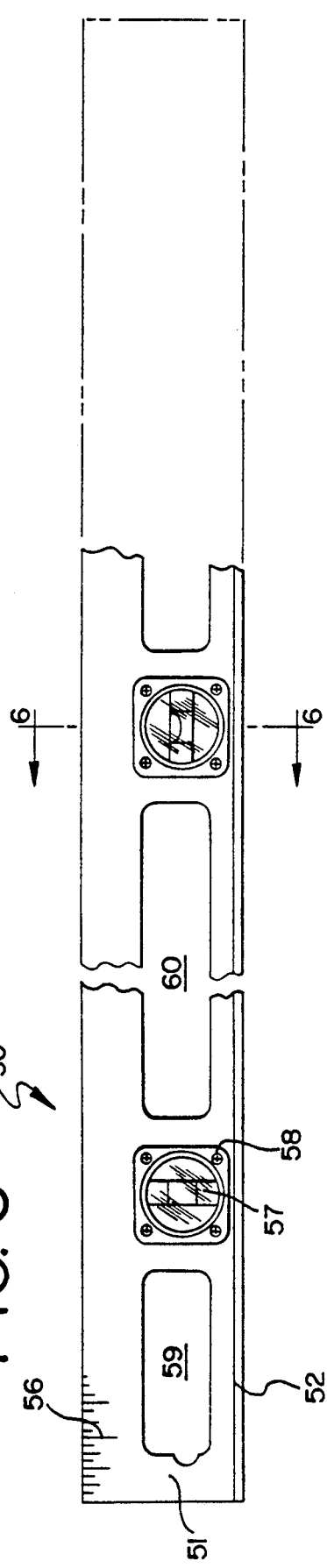
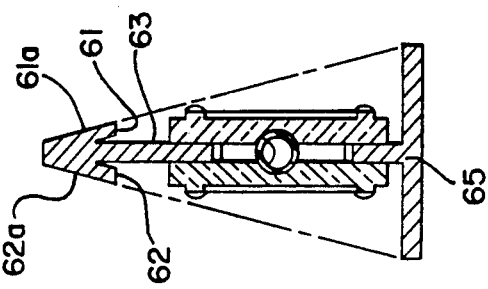
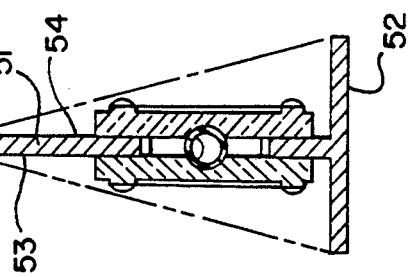

LEVEL STRAIGHT-EDGE APPARATUS AND METHOD OF CONSTRUCTION

This is a continuation of copending application Ser. No. 07/714,332 filed on Jun. 12, 1991, now abandoned, which in turn is a continuation of application Ser. No. 07/449,081 filed on Dec. 8, 1989, now abandoned, which in turn is a continuation of application Ser. No. 07/182,990 filed on Apr. 18, 1988, now abandoned.

This invention relates to a precision measuring instrument provided with measuring vials for determining level or pitch relationships and a graduated straight edge for measuring linear distance. More particularly, a first embodiment provides a level instrument of a composite aluminum and plastic construction. The plastic structure forms a body portion having the vial holders and viewing windows while the aluminum portion is a flat blade that forms the graduated straight edge. A second embodiment consists of an aluminum structure having a flat elongated frame portion and an integrally formed base portion disposed perpendicularly thereto. The frame portion forms the graduated straight edge and carries the measuring vials.

Various types of level instruments are known to the trade. However, a structurally rigid level, capable of being used in industrial settings, provided with a graduated surface which can be used as both a linear measuring instrument and a straight edge is not known in the trade. This is a significant shortcoming of the prior art, since tradesmen and artisans rely on their levels as straight edges. Moreover, the need for a separate measuring instrument, such as a ruler or a tape measure, is inefficient and cumbersome for the tradesman.

Moreover, tradesmen, such as bricklayers or carpenters, rely on their levels as "tamping devices" to assist in the alignment of the work pieces. Therefore, it is necessary that any level designed to be used by tradesmen be of a structurally rigid design so as to be able to withstand the harsh treatment of the workplace. The present invention encompasses a measuring tool, combining the linear measurement and straight edge properties of a ruler with the level, plumb and angle pitch measurement properties of a level, which is designed to be structurally sound enough to withstand the vigorous demands of the workplace.

SUMMARY OF THE INVENTION

The first embodiment of this invention solves the above noted shortcomings of the prior art by combining a flat extruded aluminum blade with an injection molded structural foam plastic body. The blade is made from cold rolled coiled aluminum formed to an exact thickness. Onto one edge of the blade are stamped markings which define the graduated straight edge of the tool. This edge of the blade functions as a ruler.

The stamped blade is inserted into a high tolerance molding die where a structural foam plastic body portion is molded over and around the opposite edge of the blade from the graduated straight edge. The molded plastic body portion forms the level vial holders and some of the working surfaces of the level. The vial holders are preferably constructed in the same snap-in manner as disclosed in U.S. Pat. No. 4,571,845.

The body portion is tapered toward the graduated straight edge such that when the tool is laid flat on a surface the working edge of the blade normally lies closely adjacent that surface. This novel combination of metal blade and structural foam body results in a structurally rigid measuring tool having the features of both an industrial accepted level and an accurate graduated straight edge.

The second embodiment consists of a flat frame member integrally connected to a base member arranged perpendicularly thereto. Along one edge of the frame member are markings defining a graduated straight edge and mounted by any suitable means at spaced intervals along the length of this member are a plurality of measuring vials for determining pitch, plumb and level relationships. The base member and frame member are dimensioned such that when the tool is laid on its side against a flat surface the edge of the frame member and one edge of the base member will abut the flat surface. In this manner the graduated straight edge will abut the surface and the measuring vials will be visible.

OBJECTS OF THE INVENTION

It is a general object of the invention to provide a measuring tool having the qualities of both an industrial accepted level and an accurate graduated straight edge.

It is another object of the invention to provide a measuring tool that is simple and economical to manufacture.

It is yet another object of the invention to provide a measuring tool, the components of which, during the manufacturing processes, are easier to store and handle than those of traditional pitch measuring devices, thus substantially reducing manufacturing and warehousing costs.

It is a further object of the invention to provide a measuring tool which is accurate to industry standards, for level, plumb, pitch and linear measurements.

It is still a further object of the invention to provide a measuring tool that has sufficient structural rigidity to withstand the harsh treatment of the workplace.

Other objects of the invention, in addition to those set forth above, will become apparent to those skilled in the art from the following disclosure.

BRIEF DESCRIPTION OF THE DRAWINGS

FIG. 1 shows a partially cut-away side view of the first embodiment of the composite measuring tool;

FIG. 2 shows a partially cut-away side view of the first embodiment of the aluminum blade;

FIG. 3 shows a section view taken along line 3—3 of FIG. 1;

FIG. 4 is a section view along line 4—4 of FIG. 1;

FIG. 5 shows a side view of a portion of a second embodiment of the invention;

FIG. 6 shows a section view of the second embodiment taken along line 6—6 of FIG. 5; and FIG. 7 shows a section view of a third embodiment similar to that shown in FIG. 6.

DETAILED DESCRIPTION OF THE INVENTION

Referring more particularly to the drawings, FIG. 1 shows a first embodiment of the measuring tool, generally, at 1. The measuring tool consists of an aluminum blade 2, a structural foam plastic body portion 3, and a plurality of level vials 4, 5, and 6 for respectively determining plumb, level and 45° angles.

The blade 2, as shown in FIG. 2, forms the frame portion of the tool and consists of a generally rectangular member made of cold rolled stress relieved aluminum. The cold rolling of the aluminum insures a uniform blade thickness that will be kept within exact predetermined tolerances. While cold rolling of the blade 2 is preferred, any process which can adequately control the tolerances on the blade thickness to within two one-thousandths of an inch can he used. The thickness of the blade 2 is critical during the injection molding process, as will be hereinafter described.

After the blade 2 is formed, the graduations 7 are produced on the working edge 8 of the blade 2. In the preferred form one face of the working edge 8 will be provided with graduations representing the English system, as shown. The opposite face will be provided with graduations representing the metric system, not shown.

While the graduations 7 may be provided by a silk screening process, it is preferred that the graduations 7 be stamped into the blade 2 by a press. In this manner the graduations 7 will be permanently formed in the blade and will not fade or be worn off with use as is the case with silk screening.

When the graduations 7 are made by the stamping process, the impact of the press on the blade 2 tends to distort the blade by spreading the aluminum in the area of each graduation in the formation of the individual markings. As the aluminum is pushed apart or spread, the working edge 8 of the blade 2 is actually stretched or distorted. While the distance the aluminum stretches for each marking is extremely small, the total amount of stretching of the blade, from the sum of each of the graduations, is large enough to produce a slight crown in the blade 2. This crown is shown in somewhat exaggerated form by the phantom line A in FIG. 2.

This distortion or crowning of the blade 2 is unacceptable for two reasons. First, the distorted blade cannot act as a straight edge. Second, the distorted blade would not fit into the injection molding die properly. Therefore, it is necessary to eliminate the distortion of the aluminum along the working edge 8 of the blade 2.

It has been found that the amount the blade is distorted is directly related to the linear sum of the lengths of each of the individual graduations. Thus, the length for one of the graduations is designated by (l) in FIG. 2. The lengths (l) of each of the individual graduations are summed to give a total length (L). The nonworking edge of the blade 9 is stamped with a series of (n) compensation marks 10, where (n) is an integer, the lengths of each of these compensation marks 10 being uniform and the sum thereof being equal to (L). Therefore, the linear sum total of the lengths of each of the (n) compensation marks 10 will be equal to the total linear length (L) of the sum of the individual graduations (l) In utilizing such graduation compensation, both the working edge 8 and the non-working edge 9 of the blade 2 will be distorted about the same amount, and since the total amount of distortion to be applied to each of opposed edges 8 and 9 of the blade 2 is theoretically equal, the blade will remain as close to perfectly straight as is necessary to provide both a leveling tool and a straight edge.

The same procedure is repeated on the opposite face of the blade for the graduations in the metric system. The English system graduations, the metric system graduations, and both sets of compensation markings are stamped into the blade in a single press operation. This system provides a very efficient method of applying the graduations 7 to the blade 2 while maintaining the blade's essential geometric integrity.

A plurality of blanked areas 11, 12, 13, 14, 15 and 16 are also provided in the blade 2. The blanked areas 11, 13 and 16 function as hand holds for the workmen and as a convenient means for hanging the tool when not in use. The blanked areas 12, 14, and 15 serve as the locations for the molded plastic vial holders. Also, a series of apertures 17 are provided along the nonworking edge 9 of the blade 2. The blanked areas 11–16 and the apertures 17 and compensation marks cooperate to maintain the rigidity of the blade 2 within the structural foam plastic body portion 3, as will hereinafter be described.

As is evident from FIG. 2 and discussed above, the completed blade is a flat piece of extruded aluminum. In known composite levels, the metal portions are either T-shaped or I-shaped, e.g. U.S. Pat. No. 4,419,833 and U.S. Pat. No. 3,311,990. Therefore, the flat design of the blade of the first embodiment of the present invention will significantly facilitate blade handling and warehousing procedures and will reduce the cost of storage and handling of the blades during manufacture.

The completed blades 2, of FIG. 2, are then placed into a high tolerance structural foam injection molding die of conventional construction. When the blade is inserted into the die, it is indexed and retained by pegs 27 in the mold which cooperate with the semi-circular notches 18 provided in the blanked areas 11 and 16 formed at opposite ends of the blade. When the die is closed, the blade 2 is also indexed by a camming action of the die on the blade. A corner of the blade 2 is forced into engagement with a mating corner of the die cavity by a camming surface located on one of the mold halves. These two indexing procedures provide that the blade 2 is accurately aligned within the mold.

The mold containing the blade 2 is then injected with a structural foam composition. The structural foam may be styrene mixed with a coloring agent, such as titanium dioxide, and a foaming agent. Specific examples of acceptable structural form compositions are set forth in U.S. Pat. No. 4,125,490. While preferred compositions of the structural foam have been disclosed, it is to be understood that other suitable types of plastic material may be used.

Maintenance of tight thickness tolerances of the blade 2 are critical to the structural foam molding operation. If the blade 2 exceeds these tolerances and is too thick, the mold will not be able to close completely about the blade during the foam injection, and the foam will extrude through the edges of the mold and create objectionable flash along the outer edge of the tool. If the blade 2 falls below predetermined tolerances and is too thin, there will be excess space between the die cavity and the blade and the structural foam will be extruded into the blanked areas 11–16 and will create undesirable flash along the inner edges of the windows.

As shown in FIG. 3, the apertures 17 allow the foam to pass from one side of the blade 2 to the other. This not only provides a uniform distribution of the foam on both sides of the blade 2 but also prevents the formation of air bubbles or voids in the structural foam body. The foam also surrounds the edges of the blanked areas 11–16, as shown in FIGS. 3 and 4 at 19a and 19b, to form windows through the blade. Upon curing of the structural foam, the blade 2 is rigidly secured to the foam body portion 3 by the plastic that surrounds the blanked areas 11–16 and that extends through the apertures 17 and into the grooves provided by the compensation marks 10. Because the blade is indexed in the mold in predetermined relationship to the foam body 3, the working edge 8 of the blade 2 will be precisely aligned with the base portion 20 and the sides 21 and 22 of the body portion 3 such that leveling can be accomplished on the working edge 8 of the blade or the base portion 20. It should be noted that there are inverted lips 23 provided on either end of the blade 2 such that the ends of the blade 2 at 21 and 22 will be of structural foam and flush with the exposed blade edges. Thus, a solid, rigid unitary composite foam-aluminum structure is formed.

As is evident from FIG. 1, a window 24 is provided in the plastic molded body over an unblanked area 25 of the blade. This area is provided to support, for example, a logo, manufacturing information and/or marketing information as desired by the manufacturer.

The molded structural foam also forms vial holders in the blanked areas 12, 14 and 15. These vial holders are of the same general type shown in U.S. Pat. No. 4,571,845. As shown in FIG. 1, a pair of identical recesses 30 and 31 are formed in the foam body on opposite sides of the window 14. The same design is also used for the vial holders in windows 12 and 15; however, these vial holders are rotated by 90° and 45°, respectively, relative to the vial holder of window 14. The recesses 30 and 31 retain the uniform cylindrical level vial 5 in the plastic body portion. The recesses, as shown in more detail in FIG. 4, comprise a cavity having a radius substantially equal to that of the level vial 5 and a cylindrical arc in excess of 180°. A slight relief 33 is provided to aid in the insertion of the level vial 5 into the opposed cavities 30 and 31. The vial 5 is snapped into these cavities and is securely held in place by ridges 34 and 35.

This design improves the efficiency of the manufacturing process because the operator of the structural foam molding apparatus can install the vials in the recesses 30 and 31 of the previously molded tool during completion of the molding and curing cycle for the next tool. In this manner a finished tool will be produced upon completion of each injection molding cycle.

The molded plastic body portion 3 of the tool is shaped, as shown in FIGS. 3 and 4, such that working surfaces 40 and 41 are angularly disposed with respect to the blade 2. The plane of the working surfaces 40 and 41, if extended as shown by the dashed line of FIG. 3, will closely approach but not quite contact the edge of the blade 2. Therefore, when either of the working surfaces 40 or 41 of the tool is laid upon a flat surface, the body portion 3 will position the working edge 8 of the blade 2 closely adjacent to the flat surface. The close proximity between the blade 2 and the flat surface will allow accurate measurement by the graduated blade while allowing the user to observe the level vials 4, 5 and 6 through the windows created by the plastic surrounding the blanked areas 12, 14 and 15. It should be noted that the base portion 20 and the sides 21 and 22 of the body portion as well as working edge 8 of the blade may be used as working surfaces for determining level, plumb or other angular relationships.

FIGS. 5 and 6 show a second embodiment of the measuring tool, generally at 50. The measuring tool 50 consists of an aluminum structure having a flat, elongated frame portion 51 and an integrally formed flat elongated base portion 52 disposed perpendicularly thereto. On both faces 53 and 54 of the working edge 55 of the frame portion 51 are markings 56 defining a graduated straight edge. In the preferred form the markings on one face represent English units and the markings on the other face represent metric units. The markings 56 could be stamped into the frame portion 51 or printed on the frame portion using, for example, a silk screening process.

Mounted to the frame portion 51 are a plurality of measuring vials 57 for determining pitch, plumb and level relationships. These vials can be mounted to the frame portion 51 using any suitable means 58, for example, that shown in U.S. Pat. No. 3,311,990.

Is is also considered desirable to provide blanked areas 59 and 60 to act as hand holds and convenient means for hanging the tool when not in use. The base portion 52 acts as a support for the tool and provides a working surface for making the pitch, plumb and level measurements.

Referring to FIG. 6, the frame portion 51 and base portion 52 are dimensioned such that when the tool is laid on its side against a flat surface, represented by the dashed line, the edge of the frame portion 51 and one edge of the base portion 52 will abut the surface. In this manner the graduated straight edge will lay closely adjacent the flat surface while the measuring vials 57 remain visible to the user. It should be noted that the lengths of frame portion 51 and base portion 52 are determined such that the vial holders 58 do not intersect the plane of the flat surface as represented by the dashed line.

FIG. 7 shows a cross-section of a modification of the metal frame 51 shown in FIG. 6. The metal frame includes flared flanged portions 61 and 62 integrally formed on the frame portion 63 and disposed at angle to the frame portion 63 such that the outer faces 61a and 62a lay in a common plane with the corner of base portion 65, as represented by the dashed line.

The modification shown in FIG. 7 is provided primarily for manufacturing purposes as will hereinafter be explained. The faces 61a and 62a are designed to receive the markings defining the straight edge (illustrated at 56 in FIG. 5) when these markings are provided using a silk screening process. Because of the nature of the existing silk screen process and the configuration of FIG. 6, where faces 51 and 53 are not in the plane represented by the dashed line, applying the silk screen is very difficult. As is readily apparent from FIG. 7, the plane of faces 61a and 62a are in the plane defined by the dashed line such that the silk screening process can be accomplished without interference from base portion 65.

It should be understood that changes, variations, and modifications may be effected in the details and operation of the present invention, without departing from the spirit and scope thereof, as defined in the appended claims.

What is claimed is:

1. A measuring tool comprising:
    a frame potion having a straight-edge along one edge and a plurality of measuring vials secured to said frame portion along the length thereof; and
    a base portion formed as part of a body portion attached to said frame portion and disposed perpendicularly thereto such that said body portion has working surfaces on opposite sides of said frame portion angularly disposed relative to the frame portion, and a plane substantially defined by the straight edge of said frame portion and one working edge of the body portion can abut a flat surface to dispose the straight edge closely adjacent to the flat surface.

2. A measuring tool according to claim 1, wherein a plurality of measuring vial holders are formed in said body portion.

3. A measuring tool according to claim 2, wherein said measuring vials are snap-fit into said measuring vial holders and are retailed by ridge formed in said body portion without additional retention means.

4. A measuring tool according to claim 1, further comprising a plurality of markings positioned adjacent to said straight edge of said frame portion, defining thereby a graduated straight edge.

5. A measuring tool according to claim 4, wherein said graduated straight edge is formed on flanges extending from said frame portion at an angle such that said flanges lie in said plane.

6. A measuring tool comprising:
a frame portion comprising: a flat blade having a working edge and a nonworking edge wherein said working edge is a straight edge, said blade having a plurality of blanked areas provided along its length and a plurality of apertures provided along its length and positioned between said plurality of blanked areas and said nonworking edge;
a body portion formed from molded plastic, said molded plastic of said body portion extending through said blanked areas and said apertures of said blade, said body portion covering the entire blade except for that portion of said blade defining the straight edge. a plurality of measuring vial holders formed in said body portion; and
a plurality of measuring vials located one each in said measuring vial holders.

7. A measuring tool according to claim 6, wherein said molded plastic of said body portion extending through said blanked areas forms windows through the measuring tool.

8. A measuring tool according to claim 7, wherein said measuring vial holders are formed at selective ones of said plurality of windows such that the measuring vials can be viewed from either side of said tool.

9. A measuring tool according to claims 6 or 8 wherein the measuring vials are snap-fit into said measuring vial holder and are retained by ridges formed in said body portion without additional retention means.

10. A measuring tool according to claim 6, wherein said body portion includes working surfaces on opposite sides of the blade, said working surfaces being angularly disposed relative to the blade such that the planes in which the working surfaces lie are closely adjacent said working edge of said blade.

11. A measuring tool according to claim 6, wherein said straight edge is provided with graduations for measuring linear distance.

12. A measuring tool according to claim 11, wherein said graduations are markings stamped into the working edge of the blade.

13. A measuring tool according to claim 12, further comprising a plurality of uniformly sized compensation markings stamped into said nonworking edge of said blade.

14. A measuring tool according to claim 13, wherein the number of compensation markings is an integer and the length of each of the compensation markings is equal to the sum total of the lengths of the graduation markings divided by the number of compensation markings.

15. A measuring tool according to claim 7, wherein a window is formed in said body portion at an unblanked area of said blade.

16. A measuring tool according to claim 6, wherein said measuring vials are angularly offset from one another.

17. A measuring tool according to claim 6, wherein a means for indexing the blade in an injection mold die is provided.

18. A method of manufacturing a measuring tool comprising the steps of:
1) forming a flat generally rectangular metal blade having a working edge and a nonworking edge,
2) providing a plurality of blanked ar the length of the blade,
3) stamping graduated markings along the working edge of the blade on at least one of its faces and a plurality of evenly spaced uniform length compensation markings along the nonworking edge of the blade on the same faces,
4) indexing the blade in an injection mold die,
5) injecting the molding die with a structural plastic foam to form a structural foam plastic body portion surrounding the blade except for the graduated working edge, the foam forming windows through the blanked areas and forming measuring vial holders in selected ones of the windows. and
6) removing the unitary structure from the die and snapping measuring vials into the measuring vial holders.

19. A method of manufacturing a measuring tool according to claim 18, further comprising:
providing a plurality of foam flow apertures along the length of the blade between the blanked areas and the nonworking edge.

20. A measuring tool comprising: a frame portion comprising a blade element, the blade element being apertured to receive liquid level vial means, the blade element having a working edge providing a straight edge; a base element formed integrally with the blade element and being laterally extended therefrom and having the surface opposite the blade element disposed normally to the plane of the blade element, the normally disposed surface of the base element acting as a level and plumb measuring surface; liquid level vial means positioned in the aperture of the blade element; means disposed between the blade element and adjacent to the aperture and the liquid level vial measuring means for securing the vial to the blade element; the laterally extended edge of the base element and the straight edge of the blade element defining a plane which generally forms the hypotenuse of the right triangle defined by the plane of the blade element and the normally disposed surface of the base element so that the frame can be rotated from the level and plumb measuring surface so that the straight edge can be utilized for scribing, the means securing the liquid level vial means to the blade element being within the planes defining the right triangles and not interfering with use of the straight edge as a scribe.

21. A measuring tool according to claim 20, including a plurality of liquid level vial apertures and vials assembled and secured thereto.

22. A measuring tool according to claim 21, wherein the vials are assembled to the blase element by cover plates.

23. A measuring tool according to claim 20, further comprising a plurality of graduations applied to the blade element adjacent to working edges for measuring linear distance so that said straight edge can be used as a linear measurer.

24. A measuring tool comprising: a frame portion comprising a blade element, the blade element being apertured to receive liquid level vial means, the blade element having a working edge providing a straight edge, and a flange element extending therefrom at an angular relation to the blade element; a base element formed integrally with the blade element and being laterally extended therefrom and having the surface opposite the blade element disposed normally to the plane of the blade element, the normally disposed surface of the base element acting as a level and plumb measuring surface; liquid level vial means positioned in the aperture of the blade element; means disposed between the blade element and adjacent to the aperture and the liquid level vial measuring means for securing the vial to the blade element; the laterally extended edge of the base element and the straight edge of the blade element defining a plane which generally forms a hypotenuse of the right triangle defined by the plane of the blade element and the normally disposed surface of the base element so that the frame can be rotated from the level and plumb measuring surface so that the straight edge can be utilized for scribing, the flange element and the means securing the liquid level vial means to the blade element being within the planes defining the right triangle and not interfering with use of the straight edge as a scribe.

25. A level measuring tool as recited in claim 24, further comprising a plurality of graduations applied to the flange element adjacent to the working edge for measuring linear distance so that the straight edge can be used as a linear measurer.

26. A level measuring tool as recited in claim 24, wherein the outer surface of said flange element is coplanar with the plane defining the right triangle, so that said flange element provides a support means for use of the straight edge as a scribe.

* * * * *

UNITED STATES PATENT AND TRADEMARK OFFICE
CERTIFICATE OF CORRECTION

PATENT NO. : 5,279,041           Page 1 of 2
DATED      : January 18, 1994
INVENTOR(S) : Randall J. Wright It is certified that error appears in the above-indentified patent and that said Letters Patent is hereby corrected as shown below:

Col. 2, line 14, after "surface", insert --,--.

Col. 3, line 5, change "he" to --be--.

Col. 3, line 10, after "form", insert --,--.

Col. 4, line 16, change "Pat.", to --Patents--.

Col. 4, line 17, after "and", delete -- U.S. Pat.".

Col. 4, line 40, change "Pat.", to --Patent--.

Col. 5, line 19, change "Pat.", to --Patent--.

Col. 6, line 9, change "Pat.", to --Patent--.

Col. 6, line 56, change "potion", to --portion--.

Col. 7, line 6, change "retailed by ridge", to --retained by ridges--.

UNITED STATES PATENT AND TRADEMARK OFFICE
CERTIFICATE OF CORRECTION

PATENT NO. : 5,279,041
DATED : January 18, 1994
INVENTOR(S) : Randall J. Wright

It is certified that error appears in the above-indentified patent and that said Letters Patent is hereby corrected as shown below:

Col. 7, line 42, after "8", insert --,--.

Col. 8, line 14, change "ar", to --areas along--.

Col. 8, line 59, after "with", insert --the--.

Col. 8, line 65, change "blase", to --blade--.

Signed and Sealed this

Tenth Day of October, 1995

*Attest:*

BRUCE LEHMAN

*Attesting Officer*   *Commissioner of Patents and Trademarks*